United States Patent [19]

Freeman

[11] Patent Number: 4,873,472
[45] Date of Patent: Oct. 10, 1989

[54] FLAT CATHODE RAY TUBE DISPLAY APPARATUS

[75] Inventor: Kenneth G. Freeman, Reigate, England

[73] Assignee: U.S. Philips Corporation, New York, N.Y.

[21] Appl. No.: 262,410

[22] Filed: Oct. 25, 1988

[30] Foreign Application Priority Data

Dec. 11, 1987 [GB] United Kingdom ............. 8729019

[51] Int. Cl.4 .................... H01J 29/70; H01J 29/72
[52] U.S. Cl. ................................. 315/366; 313/422
[58] Field of Search ..................... 315/366; 313/422

[56] References Cited

U.S. PATENT DOCUMENTS

| | | | |
|---|---|---|---|
| 4,542,322 | 9/1985 | Irie et al. | 315/366 |
| 4,667,134 | 5/1987 | Terry | 315/366 |
| 4,703,231 | 10/1987 | Tomii et al. | 315/366 |

FOREIGN PATENT DOCUMENTS

| | | |
|---|---|---|
| 1434053 | 4/1976 | United Kingdom . |
| 2124017 | 6/1982 | United Kingdom . |
| 2023332 | 10/1982 | United Kingdom . |
| 2101396 | 1/1983 | United Kingdom . |
| 2181319 | 4/1987 | United Kingdom . |

Primary Examiner—Theodore M. Blum
Attorney, Agent, or Firm—Michael E. Marion

[57] ABSTRACT

In a flat cathode ray tube display apparatus a line scanning, low energy, electron beam (18) is directed substantially parallel to a faceplate (12) carrying a phosphor screen (14) in a space between a deflection electrode array (22) and an input side of an electron multiplier (16) adjacent the screen where it is deflected by the electrode array (22) in field scan manner towards the screen. The deflector electrodes (23) in the array correspond in number to the conventional raster lines to be displayed and are switched successively between two voltage levels to step the line scanning beam. The electrodes' voltage switching drive circuit (52) may be carried on a substrate adjacent the electrodes thereby reducing the number of leadthroughs in the tube's envelope (15). For color display the screen comprises a pattern of different color phosphor elements and a color selection electrode arrangement (38) is situated at the output side of the multiplier (16). Three differently colored, and accurately superimposed, lines are drawn on the screen in a normal line scan period between stepping of the beam.

20 Claims, 2 Drawing Sheets

FLAT CATHODE RAY TUBE DISPLAY APPARATUS

BACKGROUND OF THE INVENTION

This invention relates to a flat cathode ray tube display apparatus comprising a cathode ray tube having an envelope, a luminescent screen extending over a substantially flat faceplate, a deflection electrode array within the envelope extending parallel to the screen and comprising a plurality of individual deflector electrodes, a planar electrode spaced from the deflection electrode array and overlying the screen, means in the envelope for producing and directing a line scanning electron beam substantially parallel to the faceplate between the deflection electrode array and the screen, a drive circuit comprising a plurality of output stages each of which is connected to a respective electrode of the deflection electrode array, the deflection electrode array being operable by the drive circuit for deflecting the line scanning beam in a direction towards said faceplate in field scanning manner whereby the electron beam is scanned over the luminescent screen in a television raster fashion.

An example of such a flat cathode ray tube display apparatus is described in British patent specification No. 2,101,396B (U.S. Ser. No. 830,388 filed Feb. 14, 1986). In the apparatus described therein, the line scanning beam is produced by an electron gun and electrostatic deflector arrangement and directed substantially parallel to the faceplate in a rear region of the tube before being turned through 180 degrees by a reversing lens at one end of the tube and introduced into a region between the deflection electrode array and the screen with the plane of the line scanning beam being substantially parallel to the faceplate. The electron beam is a low-energy beam, and in the particular example described is a low current, low voltage beam of around 400 volts acceleration. A channel electron multiplier is situated parallel to, and spaced from, the screen and the electron beam is deflected by the deflection electrode array over an input side of the electron multiplier, constituting a planar electrode, to provide a raster-scanned input thereto. Having undergone current multiplication within the electron multiplier, the beam is accelerated onto the screen by means of a high voltage field established between the output side of the multiplier and a backing electrode on the screen to produce a raster-scanned display picture. Such a display apparatus may be used for television or other video display purposes.

In the known apparatus, the line scanning beam is deflected progressively downwards over the input side of the multiplier in field scan fashion by selective energisation of a plurality of vertically-spaced horizontally elongate electrodes forming the deflection electrode array and situated parallel to the faceplate on the opposite side of the electron beam path and which, in conjunction with the planar electrode at a fixed potential, create deflection fields for the beam.

The electrode array is driven to achieve continuous vertical scan by applying ramp voltages to adjacent pairs of electrodes in turn successively, the timing of the ramp voltages to the electrodes of each pair being predetermined. This form of driving allows a small number of electrodes to be used in the array, typically around fifteen. However, because of the way in which the electrodes are driven, the drive circuit necessary is complicated (for example as described in British patent specification No. 2,164,829A). The drive circuit is provided externally of the tube's envelope and is interconnected with the electrodes of the deflection array via respective lines thereby requiring a large number of lead-throughs to be provided in the envelope. Two electrodes of the array are driven at a time with suitably timed linear ramps and careful control of the ramp shape and start and stop times is necessary.

British patent specification No. 2,181,319A describes a version of this known type of display apparatus for displaying full colour pictures. The described apparatus has a luminescent screen which consists of a repeating pattern of three phosphor elements adapted to luminesce in different colours respectively, and further includes colour selection electrodes disposed intermediate the output side of the electron multiplier and the screen which are operable to deflect the electron beam exiting from the channels of the multiplier and by appropriate control of which the beam can be directed selectively onto each of the plurality of phosphor elements.

The colour selection electrodes used in this apparatus are in the form of a pair of electrodes for each channel of the electron multiplier arranged on opposite sides of the channel axis by means of which the electron beam exiting from the channel can be deflected to one side or the other so as to impinge upon respective ones of the phosphor elements to display selectively first and second colours, namely red and blue. In the undeflected state, that is with no potentials or the same potentials applied to the pairs of electrodes, the electron beam is directed onto the third phosphor element of the repeating pattern to produce a green display.

This display apparatus enables therefore a colour picture to be produced using a single electron beam which is scanned in raster fashion over the input side of the electron multiplier, the required line and field scan deflectors operating on the beam prior to reaching the electron multiplier.

The display apparatus may be used in order to display television pictures according to a conventional standard scanning format, for example the PAL standard of 625 lines, 50 Hz field format where the input red, green and blue signals are derived from an RGB source such as a camera, telecine or from a PAL decoder.

There is described in the aforementioned British patent specification No. 2,181,319A, a driving technique for producing colour television pictures from such a tube in which line scanning and colour selection are performed sequentially at three times the normal, i.e. standard, rate 46.875kHz for the PAL system, the red, green and blue components of each television line being stored, time-compressed and displayed in sequence during one standard line period of 64 microseconds. Thus each normal television line is presented as three individual, and respectively coloured, lines each of which is drawn in one third of the normal line period. This driving technique will hereafter be referred to as triple line sequential operation.

In one possible mode of operation, vertical field scanning is effected in a continuous manner. For this, approximately linear ramps are successively applied to successive adjacent pairs of the electrodes of the array in predetermined relationship giving a conventional raster. The number of the individual electrodes in the array, typically fifteen, is a compromise dictated by the need to achieve vertically-uniform spot-height and picture geometry and brightness, whilst keeping the number of tube lead-throughs and external circuitry needed to drive the electrodes to a minimum. This requires the ramps to be non-linear in a particular manner and their start and end times to be accurately defined. Depending on the selection sequence adopted, that is, the order in which the individual colour lines are drawn, it can be expected that with such continuous vertical scan visible colour line structure, crawl or flicker impairments to the display will occur.

In an alternative mode of operation, vertical scan is effected in a stepped manner with the three individual colour lines ideally being superimposed on one another and thereafter the scanning beam is deflected one step to the next television line position and the process repeated. This mode of operation obviates the aforementioned display impairments as the red, green and blue component of each television display line are overlaid and the eye cannot detect the residual temporal errors. This technique also makes it possible to ensure a uniform line pitch and raster brightness. Stepped deflection can be achieved by replacing the linear ramps by non-linear staircase waveforms derived from values stored in digital memories, each step taking place during line blanking. In order to ensure an acceptable uniform field scan by this method it is considered that the memories would need to have around 12-bit resolution and the subsequent analogue circuits would need to have a very high stability. Such components would likely add significantly to the cost of the display system.

It is an object of the present invention to provide an improved form of flat cathode ray tube display of the kind mentioned in the opening paragraph.

It is another object of the present invention to provide a flat cathode ray tube display apparatus of the aforementioned kind which is capable of providing colour displays of acceptable quality by using stepped field-scan operation but without the need to provide expensive components as described.

SUMMARY OF THE INVENTION

According to the present invention, there is provided a display apparatus of the kind mentioned in the opening paragraph which is characterized in that the deflection electrode array comprises one deflector electrode for each conventional standard raster line to be displayed, and in that the drive circuit is operable to switch the voltage applied to each deflector electrode from a first predetermined level to a second predetermined level in sequence so as to step the line-scanning beam in the field direction.

In cooperation with the planar electrode overlying the screen, the voltages applied to the deflector electrodes are controlled to create a beam deflection field.

Preferably, the line scanning electron beam is a low energy electron beam, that is, up to around 2.5KeV and typically around 400eV, and the tube further includes a channel electron multiplier disposed parallel to, and spaced from, the screen over whose input side the electron beam is scanned by the deflection electrode array. In this case the planar electrode may be constituted by the input side of the multiplier.

Assuming the planar electrode is at a certain voltage, and the electrodes of the deflection electrode array are at substantially the same voltage, no deflection of the line scanning beam occurs. If a deflector electrode is made negative with respect to the planar electrode, the line scanning beam is caused to be deflected from its plane substantially parallel to the screen towards the screen in the region of that electrode. By appropriate switching of the potentials applied to each of the electrodes of the array with respect to the planar electrodes in succession and at regular intervals from one to the other of two selected levels a deflection field acting on the beam is in effect moved progressively in regular steps vertically, corresponding to the deflector electrode spacing and the required line spacing, so that the region at which the beam is caused to be deflected towards the screen, and hence the position where the line scanning beam impinges the screen, is displaced vertically in stepped fashion to achieve field scanning.

While the number of electrodes in the array is considerably increased compared with the earlier form of deflection electrode array, driving the electrodes is not unduly difficult to accomplish since only simple voltage switching of the electrodes is required rather than the application of non-linear staircase waveforms for example. Moreover, because of the comparative simplicity of the switching drive circuitry needed for operating the deflection electrode array in this manner, this circuitry may readily be incorporated within the tube's envelope, thereby avoiding the need to provide a large number of leadthroughs in the tube envelope to connect the electrodes of the array to external circuitry as in the case in the earlier form of display apparatus. The timing and switching elements of the circuitry may, for example, be fabricated using LSI technology. For convenience and simplicity, such circuitry may be formed on a substrate upon which the deflection electrode array is carried. The electrodes can be deposited for example using photolithographical techniques on an insulating substrate such as glass. This arrangement therefore overcomes the problem of interconnecting the large number of electrodes involved to the associated drive circuitry. Interconnections between the electrodes and drive circuitry can be deposited as tracks simultaneously with the electrodes. The only connections from outside the tube then necessary are d.c. voltage and timing lines.

While the invention offers, therefore, a significant advantage in this respect over the known form of display apparatus, for monochrome display, a further important advantage is obtained in the case of the display apparatus being a colour display apparatus using a triplet pattern screen and a colour selection electrode arrangement as previously described.

When this apparatus is driven in triple line sequential fashion, the deflection electrode array of the invention removes the need to apply high precision staircase waveforms to the electrodes of the array in the case of advantageous stepped vertical scan. Instead the stepped vertical scan is achieved by the switching of the electrodes of the array between predetermined levels, thereby simplifying driving of the tube and ensuring accurate superimposition of the three differently-coloured sub-lines constituting a standard TV line. The need for digital memories and the stable drivers is avoided.

Preferably, the electrodes of the array are switched by a drive circuit in succession in a field period from a first predetermined voltage to a second predetermined voltage at normal, standard, line scan intervals, namely 64 microsecond intervals for TV display, within conventional line blanking intervals. In a preferred arrangement, the drive circuit comprises a transistor switching bridge circuit for each deflector electrode which are connected to common sources of the first and second predetermined voltages, and a control circuit for operating the bridge circuits one after the other according to normal line scan intervals.

It may be possible for the electrodes of the deflection electrode array to be operated such that, at the beginning of each field, all the electrodes are at the first predetermined voltage, corresponding substantially with the voltage of the planar electrode, and are each individually switched in turn to the second predetermined voltage, negative with respect to the first predetermined voltage, with the electrode immediately preceding the one switched to the second predetermined voltage being returned to the first predetermined voltage at the same time so that, at any one time, only one electrode is at the second predetermined voltage or with the immediately preceding electrode being returned to the first predetermined voltage only after a plurality of subsequent electrodes have been switched to the second predetermined voltage so that at any one time a plurality of successive electrodes are at the second predetermined voltage. Preferably, however, the electrodes are operated such that, at the beginning of each field, all the electrodes are at the first predetermined voltage and are individually switched in turn in a field period to the second predetermined voltage at standard line scan intervals so as to move the point at which the line scanning beam is deflected towards the input face progressively vertically over the input face. This operation has the advantage that it is necessary to switch each electrode only once during a field display with the electrodes being returned to the second predetermined voltage in the standard field blanking period prior to the beginning of the next field display.

BRIEF DESCRIPTION OF THE DRAWINGS

A cathode ray tube display apparatus in accordance with the invention and for displaying colour pictures will now be described, by way of example, with reference to the accompanying drawings, in which.

DETAILED DESCRIPTION OF THE INVENTION

Figure 1:
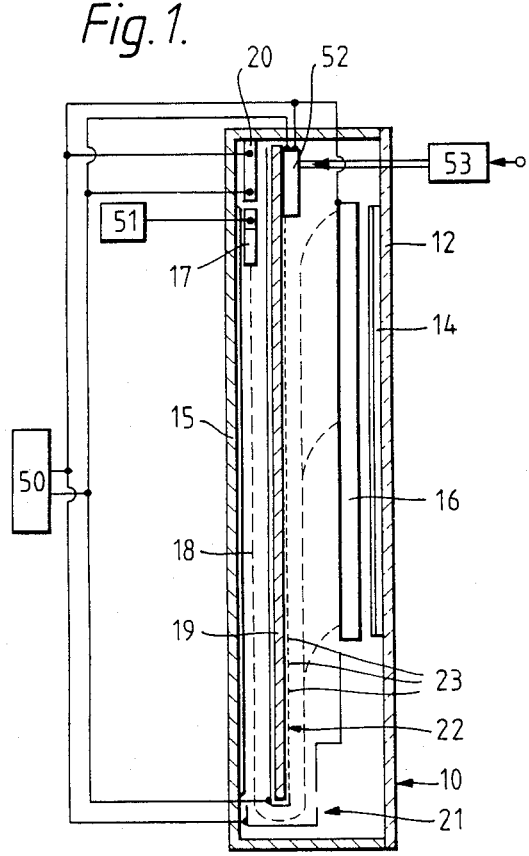
FIG. 1 is a diagrammatic elevation through a flat display tube of the apparatus and shows schematically associated drive circuitry.

Referring to FIG. 1, there is shown a flat cathode ray tube which comprises a rectangular envelope 15 having a substantially flat glass faceplate 12. On the inside of the faceplate 12 there is provided a phosphor screen 14 comprising repeating groups of red, R, green, G, and blue, B, vertically extending phosphor lines. A channel plate electron multiplier 16 having apertured input and output surface electrodes is arranged parallel to, and spaced from, the faceplate 12. An electron gun 20 is disposed in the rear portion of the envelope and directs a low-energy electron beam 18 downwardly in a direction parallel to the faceplate 12 between the rear wall of the envelope 15 and a partition 19, the rear wall and partition carrying electrodes defining a field free space therebetween. The beam is deflected in a plane parallel to the faceplate 12 to effect line scanning by means of an electrostatic deflector 17 positioned near the gun 20. The line scanning beam 18 is deflected through 180 degrees by a reversing lens 21 at the lower end of the envelope so that it travels in the opposite direction over the other side of the partition 19.

The partition 19, which is of glass or other insulative material, carries a plurality of selectively energisable, vertically spaced, horizontally elongate strip-like electrodes 23 forming a deflection electrode array 22. In order to counter the effect that the line of the line scanned beam is slightly bowed rather than straight after reflection by the reversing lens 21, the electrodes 23 are slightly bowed in the opposite direction. The electrodes 23 are operable to effect vertical field scanning of the line scanning electron beam 18 over the input face of the channel plate electron multiplier 16, as will be described in greater detail. Having undergone electron multiplication within the multiplier 16, the beam is accelerated on to the phosphor screen 14 by means of an aluminium backing electrode of the screen. Thus, the line scan deflector 17 and field scan electrode array 22 serve to scan the single electron beam 18 in raster fashion over the input face of the channel plate electron multiplier 16 to produce a raster scanned picture on the screen 14.

The colour display tube of FIG. 1, apart from the electrode array 22 and its associated drive as will be described, is similar in certain respects to the tube described in British patent specification No. 2101396B (U.S. Ser. No. 830,388) and reference is invited to this specification for a more detailed description of the tube and its construction. An important difference however is that the tube of the aforementioned specification is monochrome, having a single colour phosphor screen, whereas the tube of FIG. 1 is intended for colour display and accordingly is provided with additional features for this purpose.

Figure 2:
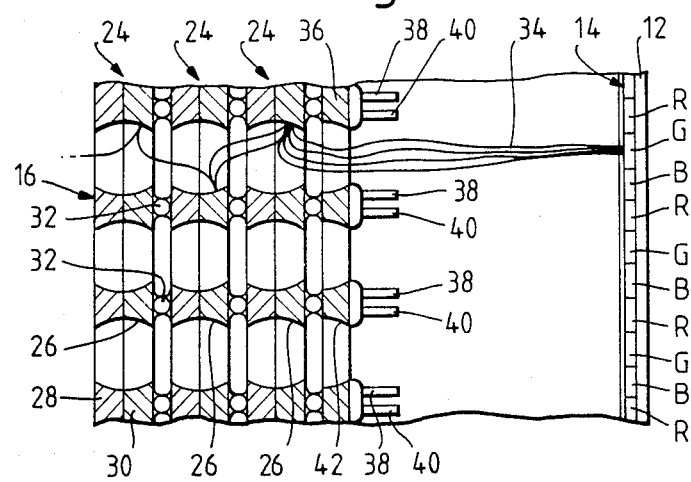
FIG. 2 is a transverse sectional plan view, not to scale, depicting the screen and the faceplate of the tube and the final three stages of a laminated channel plate electron multiplier, and a colour selection electrode arrangement used in the tube.

The channel plate electron multiplier 16 may be a laminated dynode kind of multiplier. Examples of the construction of this kind of multiplier. Examples of the construction of this kind of multiplier are given in British patent specification Nos. 1,434,053 (U.S. Pat. No. 4,482,836) and 2,023,332A. Briefly, the electron multiplier 16 comprises a plurality of apertured dynodes 24 of which the last three are shown in FIG. 2. The barrel-shaped apertures 26 in successive dynodes are aligned with each other to form channels. The dynodes 24 in fact comprise two half dynodes 28, 30 arranged back to back. Successive dynodes 24 are separated from each other by a resistive or insulating spacing means which in the illustrated embodiment comprise ballotini 32. The side of the multiplier 16 facing the array 22 is covered by a planar apertured input electrode. In operation the electron beam 18 entering a channel undergoes current multiplication by secondary emission as it passes from one dynode to the next, each of which is typically 300V more positive than the previous one. In order to extract the current multiplied electron beam 34 from the final dynode of the electron multiplier 16, an extractor electrode 36 is provided. This extractor electrode 36 generally comprises a half dynode mounted on, but spaced from, the final dynode. A positive voltage, typically +200V relative to that of the last dynode, is applied to the extractor electrode 36 which not only draws out the electron beam 34 but also focuses it.

With the illustrated arrangement of the phosphors R, G and B in the repeating groups, an undeflected, current multiplied electron beam 34 will impinge on the green phosphor G. To impinge on the red, R, and blue, B, phosphors the electron beam 34 is deflected to the left and to the right, respectively, (i.e. up and down respectively in FIG. 2). This is achieved by colour selection electrodes comprising pairs of electrodes 38, 40 (not shown in FIG. 1) arranged one on each side of each aperture 42 in the extractor electrode 36. The apertures 42 are aligned rectilinearly in columns and the electrodes 38, 40 are elongate, extending the height of the columns. All the electrodes 38 are interconnected as are the electrodes 40. The electrodes 38, 40 are electrically insulated from the extractor electrode 36. The deflector electrodes 38, 40 act as part of the lens system which forms an electron beam 34 of the required size. The colour selection electrode arrangement is described in greater detail in published British patent specification No. 2124017A, (U.S. Pat. No. 4,560,898) whose disclosure is incorporated herein by reference.

In operation, in order to deflect the electron beam 34 it is necessary to apply a potential difference between the sets of electrodes 38, 40. For example, in a situation where relative to the final dynode the extractor electrode 36 is at, say, +200V and the screen 14 is at, say, +7 to 12kV, then for an undeflected beam 34 a mean voltage of +125V is applied to the electrodes 38, 40 and in this case to obtain a deflection in one direction or the other a potential difference of, say, 60V is produced so that for a deflection onto the red phosphor, R, the electrode 40 is at +155V while the electrode 38 is at +95V, the voltages being the opposite way around for deflection onto the blue phosphor B.

The mode of operation of the apparatus to display pictures in accordance with received video signals conforming to a standard format will now be described. The following description concerns the display of video signals according to the standard PAL scanning format by way of example, that is 625 lines, 50Hz field format where input red, green and blue signals are derived from sources such as a PAL decoder, or a camera or telecine. It will be appreciated that the apparatus may be used with other standard formats instead.

Line scan is performed by the deflector 17 at three times the normal, standard rate, that is, three times the rate determined by the standard PAL scanning format, and the red, green and blue components of each standard PAL line are displayed in turn, separately, in the form of three respectively coloured lines during the normal standard line period, which is 64 82 s. In order to do this, the necessary sequential, time-compressed, colour components are derived using a number of television line-stores which store a respective one of the three colour components for each PAL line and which are read-out at three times the write-in rate. The colour deflection voltages applied to the colour selection electrodes, 38 and 40, are cyclically changed line-sequentially between the three values necessary to deflect the electron beam 34 emerging from the channel plate electron multiplier 16 onto the respective red, green and blue phosphor lines of the screen 14. Either reversing (RGBBGRRGBBG . . . ) or continuous (RGBRGB . . . ) colour sequences may be used. As successive lines are scanned in the different colour selection modes, the appropriate red, green and blue primary signals are sequentially supplied to the electron gun 20 in synchronism. For further information regarding this triple line sequential operation, reference is invited to published British patent specification No. 2181319A (U.S. Ser. No. 914,047 filed Oct. 1, 1986).

Vertical field scanning of the electron beam is accomplished by stepping the vertical scan after every three triple-PAL rate scanning lines, that is, after each block of three separate and differently coloured lines corresponding to a single PAL standard line, so that the red, green and blue components of each standard PAL line are superimposed and the maximum spatial error is, in principle, zero. To achieve this discontinuous, stepped, triple line sequential operation, the electrodes 23 of the deflection electrode array 22 are selectively switched between predetermined potential levels, whereby after every group of three lines drawn corresponding to a single PAL line, i.e. every 64 μs, the beam is stepped downwardly over the input face of the multiplier by an amount corresponding to the spacing of a standard line.

To this end, and in accordance with the invention, the number of individual electrodes 23 in the deflection electrode array 22 corresponds to the number of conventional active raster lines used to produce a display picture in the field. Each of the electrodes 23 is individually switchable between two predetermined voltage levels to cause deflection of the line scanning beam towards the input face of the multiplier 16 in the region of the electrode switched. The size and spacing of the channels in the multiplier 16 are such that each display line has associated with it at least one row of channels.

In operation of the tube, and referring again to FIG. 1, the following typical voltages may be applied with respect to a cathode potential of the electron gun 20 of 0V. The final anode of the gun is held, by means of a power supply 50, at 400V giving an electron beam acceleration voltage of 400V. Line deflection is accomplished by applying regularly potential changes of about ± 60V around a mean of 400V (with adjustment for trapezium correction) to the plates of the line deflector 17 by a line deflector output stage 51. The trough-like electrode of the reversing lens 21 is at 0V compared to the 400V potential applied to an electrode at the facing bottom edge of the partition 19 to reflect the line scanning beam 18 through 180 degrees. The apertured electrode at the input face of the multiplier 16 is at 400V. The voltage across the multiplier is typically about 1500V. The voltage of the electrode on the screen, for example, 12kV, provides the necessary acceleration for the beam emanating from the multiplier to produce a visible output from the screen.

At the beginning of each field scan, the electrodes 23 are at 400V, forming with the electrode at the input face of the multiplier a field free space, but are subsequently switched individually in sequence by a switching circuit 52 to 0V in turn starting with the uppermost electrode 23 and progressing downwardly of the array so that the line scanning beam 18 is initially deflected into the uppermost channels of the multiplier 16 and then moves progressively downwardly over the multiplier in steps, the point of deflection being determined by the next electrode 23 in the array to be switched to 0V so that the line scanning beam is stepped downwardly in increments corresponding to the spacing of the electrodes 23. To this end, the switching circuit 52 is connected to the 0V and 400V outputs from the power supply 50 and also to a timing circuit 53 supplied with TV picture timing signals.

The deflection electrode array 22 and its operation will now be described in greater detail with reference to FIGS. 3, 4 and 5. To simplify this description it will be assumed that the complete raster is sequentially scanned. However, it will be appreciated that, with appropriate changes to the drive circuitry for the array, the electrodes 23 may be operated in a suitable manner during alternate fields to produce an interlaced raster scan. For interlaced scans producing a frame in two consecutive fields, pairs of adjacent deflector electrodes could be switched at a time with a one deflector electrode offset for alternate fields resulting in half the number of display lines being displayed in each field with the lines of alternate fields being vertically displaced.

The number of electrodes 23 in the array 22 corresponds with the number of active lines to be displayed, namely 575. FIG. 3 shows schematically the first six of these electrodes, together with their associated drive circuitry. Each electrode 23 is switched using a 2-level bipolar transistor (or MOSFET) switching bridge, comprising npn and pnp transistors 61 and 62 (or N-channel and P-channel MOSFETs) connected to respective opposite ends of the electrode. The transistors 61 and 62 are controlled by voltage waveforms from drive logic circuits 63 and 64 supplied with timing signals in the form of TV line pulses, LP, and TV field pulses, FP, illustrated schematically in FIG. 3, provided by the timing circuit 53. When switched, the transistors 61 and 62 serve to connect the associated electrode 23 to either a voltage rail 65 at 0V or a voltage rail 66 at 400V, the timing and duration for the switched condition being indicated in FIG. 3 by the switching waveforms in the associated output lines from the drive logic circuits 63 and 64, whose generation will be described subsequently. Thus successive electrodes are switched from 400V to 0V by successive line drive pulses. All the electrodes 23 are reset to 400V during field blanking. The transistors 61 and 62, and drive logic circuits 63 and 64 constitute the aforementioned switching circuit 52.

The switching circuit 52, rails 65 and 66 and interconnecting lines can be readily fabricated using LSI and thin film technology in space available on the partition 19 alongside the electrodes 23. For the circuit shown in FIG. 3 energy is only dissipated when actually charging or discharging the capacitance of each electrode. In this case switching the set of 575 electrodes 23 will consume only a fraction of a watt.

In an alternative, modified, arrangement which would save half of the switches and half of the drive logic circuitry, the pnp (or p-channel) switches are replaced with high value thin-film resistors. This arrangement has the disadvantage that it would result in continuous power dissipation in each stage from "switch-down", that is, when the electrode is switched to 0V, until the end of the field scan. Since the resistor value must be low enough to discharge fully the electrode capacitance (typically in the order of 10pF or less) during the 1.6ms field blanking interval and low enough to swamp any leakage resistance, a likely value is in the region of 10 Megohms, which would give a total switching power consumption of a few watts. This power consumption could, however, be reduced by switching each electrode back to the first voltage level, 400V, within the field period a certain time after it is switched to 0V corresponding to a number of subsequent steps of the line scanning beam, the number of steps being chosen such that this switching does not perturb the beam.

Figure 3:
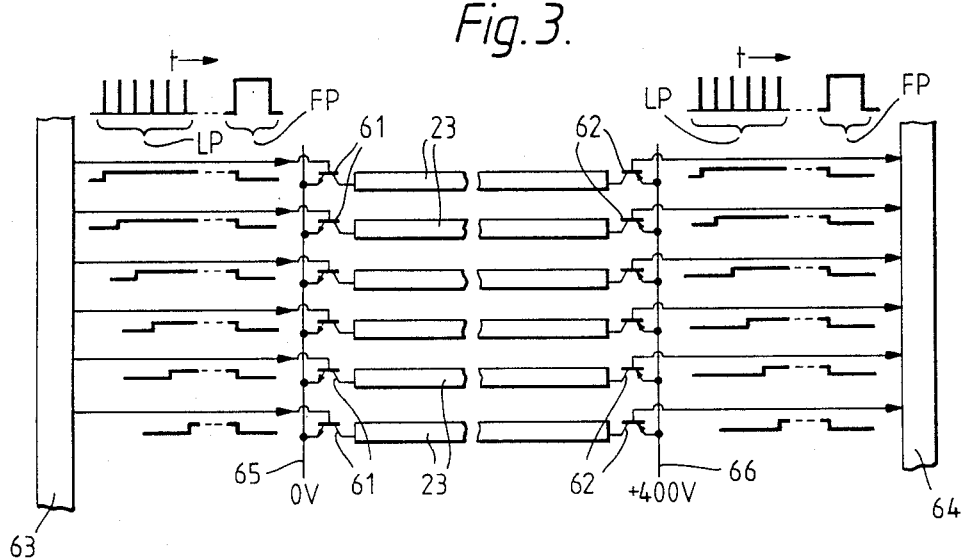
FIG. 3 shows schematically the first six electrodes of a deflection electrode array of the display tube and their associated drive circuitry for performing vertical scanning of a line-scanning electron beam within the tube.
Figure 4:
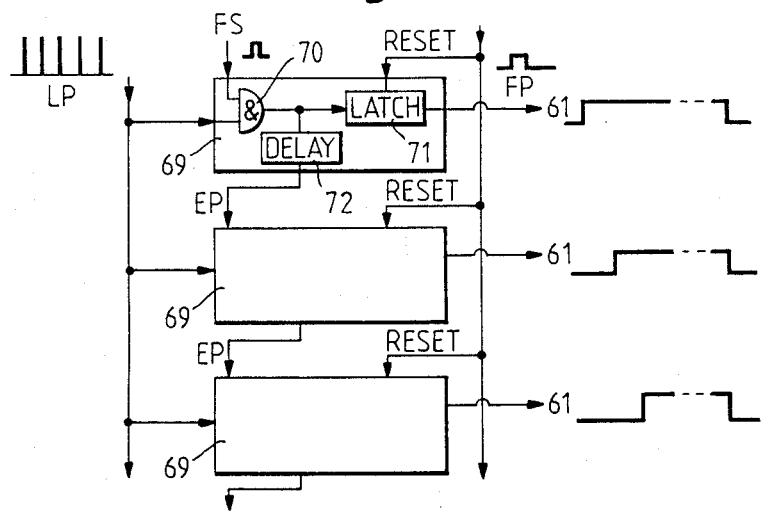
FIG. 4 shows diagrammatically a part of the deflection electrode drive circuitry associated with the first three electrodes of the array.

FIG. 4 schematically illustrates the first three stages of the drive logic circuit 63 for driving the npn (or N-channel) switches 61 on the low voltage side as shown in FIG. 3 associated with the first three electrodes 23. A similar circuit (but with inverse polarity supply voltage) is used to drive the pnp (or p-channel) switches 62 in the case where the pairs of switches are employed. In the example shown, each stage, 69, consists of an AND gate 70, a resettable latch circuit 71 and a pulse delay circuit 72. Considering the first stage, a train of line drive pulses LP and a field start pulse FS, also supplied by the timing circuit 53, are fed to the AND gate. The output of this gate is fed to the latch circuit 71 which turns on the associated switch 61 for the rest of field scan, with reset occurring during field retrace as a result of field pulse FP. The output of the AND gate 70 is also fed to a suitable delay circuit 72, such as a dual monostable, which provides an enable pulse EP for the next driver stage 69 associated with the succeeding electrode 23. The duration of this enable pulse is chosen so as to span the duration of the next line pulse. In this way successive deflector electrode switches 61 are turned on by successive line pulses, without the need for counters etc.

Ideally the complete drive logic system would be executed in a VLSI/thin film technology adjacent to the switches 61 and 62 and deflector electrodes 23 with direct connection via deposited conductors. Alternatively, with a change of output conductor pattern the drive logic system could take the form of a number of LSI modules. In either case it will be seen that the inputs to the drive logic are few in number, namely three pulse inputs together with the logic supply voltage(s) (which, although not shown in FIGS. 1 and 4 for simplicity, may be obtained from the power supply 50). In fact by using an extra IC pulse separator module it would be possible to reduce the pulse signal input to a single composite pulse waveform. This may be advantageous where it is necessary to couple in the pulses via an opto-coupler to accommodate large voltage level shifts (as might be the case for the pnp/p-channel switch drivers).

For an interlaced scan formed during two consecutive fields, the drive logic circuitry may be modified so that alternate adjacent pairs of electrodes 23 are switched during alternate fields.

Figure 5A:
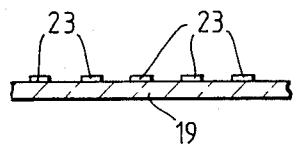
FIGS. 5A and 5B illustrate respectively in cross-sections different constructional forms of the deflector electrode array.
Figure 5B:
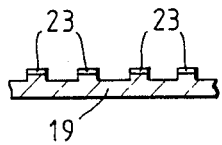

FIGS. 5A and 5B are diagrammatic cross-sections through a portion of the deflector electrode array carrying partition 19 and show two ways in which the electrode array may be formed. Taking for example a tube having a display area of around 240 mm by 180 mm with 575 active lines in the raster the electrode pitch required will be approximately 0.3 mm. Bearing in mind the need for 400V, or more, isolation between adjacent electrodes 23 a typical arrangement would be to use electrodes 0.1 mm wide and separated by 0.2 mm. These could be deposited on the flat surface of the glass partition 19, as shown in FIG. 5A, using any suitable known technique. Alternatively, to obviate charging effects, it might be considered preferable to use a photoetchable glass for the partition 19 and to etch this glass to produce, in cross-section, a castellated surface profile, as shown in FIG. 5B. The electrodes 23 are then deposited on the plateau of this surface, for example by evaporation of nickel at an oblique angle, with the intervening troughs in the surface of the glass providing adequate isolation.

The above described deflector electrode array arrangements and their drive systems offer a means of achieving very uniform stepped vertical scan for the colour tube, which requires only three (pulse) drive waveforms, or one composite waveform, and one or two logic circuit supply voltages to be provided from outside the envelope, in addition to the switching voltage levels, which, in any event, could already be present within the envelope for other components.

While in the embodiment described above the line scanning beam is produced in a rear region of the tube and directed into a front region by a reversing lens where it is field scanned over the screen, it will be appreciated that different tube configurations may be used where the line scanned electron beam producing means is situated to one end of the space between the deflection electrode array and the screen.

I claim:

1. A flat cathode ray tube display apparatus comprising a cathode ray tube having an envelope, a luminescent screen extending over a substantially flat faceplate, a deflection electrode array within the envelope extending parallel to the screen and comprising a plurality of individual deflector electrodes, a planar electrode spaced from the deflection electrode array and overlying the screen, means in the envelope for producing and directing a line scanning electron beam substantially parallel to the faceplate between the deflection electrode array and the screen, a drive circuit comprising a plurality of output stages each of which is connected to a respective electrode of the deflection electrode array, the deflection electrode array being operable by the drive circuit for deflecting the line scanning beam in a direction towards said faceplate in field scanning manner whereby the electron beam is scanned over the luminescent screen in a television raster fashion, characterized in that the deflection electrode array comprises one deflector electrode for each conventional standard raster line to be displayed, and in that the drive circuit is operable to switch the voltage applied to each deflector electrode from a first predetermined level to a second predetermined level in sequence so as to step the line-scanning beam in the field direction.

2. A flat cathode ray tube display apparatus according to claim 1, wherein the line scanning electron beam comprises a low energy beam of less than 2.5 KV and in that the tube further includes a channel electron multiplier disposed parallel to, and spaced from, the faceplate over whose input side the electron beam is scanned by the deflection electrode array to provide electron input thereto.

3. A flat cathode ray tube display apparatus according to claim 2, wherein the luminescent screen comprises a repeating pattern of three phosphor elements adapted to luminesce in different colours respectively, in that the tube further includes a colour selection electrode arrangement between the output side of the electron multiplier and the screen which is operable to deflect selectively the electron beam exiting from the channels of the multiplier towards each of the three phosphor elements, and in that the deflection electrode array is driven to deflect the line scanning beam in the field direction in steps at regular intervals corresponding to normal line scan intervals and the colour selection means and means for line scanning the electron beam are operated such that three differently coloured lines are drawn on the screen between each step of the line scanning beam.

4. A cathode ray tube display apparatus according to claim 1, wherein at the beginning of each field, the electrodes of the deflection electrode array are all at the first predetermined voltage and are switched in turn in a field period to the second predetermined voltage at standard line scan intervals so as to scan the line scanning beam progressively in the field direction.

5. A cathode ray display tube according to claim 4, wherein the first predetermined voltage corresponds substantially with the voltage of the planar electrode and that the second predetermined voltage is negative with respect to that voltage.

6. A cathode ray tube display apparatus according to claim 5, wherein the drive circuit for the deflection electrode array comprises for each deflector electrode of the array a transistor switching bridge circuit, the plurality of bridge circuits being connected to their respective electrodes and to common sources at the first and second predetermined voltages, and a control circuit for operating the transistor switching bridge circuits one after the other according to normal line scan intervals.

7. A flat cathode ray tube display according to claim 1, wherein the drive circuit for the deflection electrode array is contained within the tube's envelope.

8. A flat cathode ray tube display apparatus according to claim 7, wherein the deflection electrode array is provided on a substrate within the envelope and in that the deflection electrode array drive circuit is carried on said substrate adjacent to the electrodes of the array and connected thereto by tracks on the substrate.

9. A flat cathode ray tube display apparatus according to claim 8, wherein the substrate comprises insulative material and in that the drive circuit is formed on the substrate using an LSI fabrication process.

10. A cathode ray tube display apparatus according to claim 8 or claim 9, wherein the electrodes of the deflection electrode array and said tracks comprise conductive material deposited on the substrate.

11. A cathode ray tube display apparatus according to claim 10, wherein the surface of the substrate comprises a series of troughs and plateau and in that the electrodes of the array are deposited on respective plateaux.

12. A cathode ray tube display apparatus according to claim 1, wherein the means for producing and directing the line scanning beam comprises an electron gun and a line deflector in a rear region of the tube which directs the line scanning beam in that region substantailly parallel to the faceplate and a reversing lens towards one end of the tube which directs the line scanning beam into a front region of the tube over the deflection electrode array.

13. A cathode ray tube display apparatus according to claim 2, wherein at the beginning of each field, the electrodes of the deflection electrode array are all at the first predetermined voltage and are switched in turn in a field period to the second predetermined voltage at standard line scan intervals so as to scan the line scanning beam progressively in the field direction.

14. A cathode ray tube display apparatus according to claim 3, wherein at the beginning of each field, the electrodes of the deflection electrode array are all at the first predetermined voltage and are switched in turn in a field period to the second predetermined voltage at standard line scan intervals so as to scan the line scanning beam progressively in the field direction.

15. A flat cathode ray tube display according to claim 2, wherein the drive circuit for the deflection electrode array is contained within the tube's envelope.

16. A flat cathode ray tube display according to claim 3, wherein the drive circuit for the deflection electrode array is contained within the tube's envelope.

17. A flat cathode ray tube display according to claim 4, wherein the drive circuit for the deflection electrode array is contained within the tube's envelope.

18. A flat cathode ray tube display according to claim 5, wherein the drive circuit for the deflection electrode array is contained within the tube's envelope.

19. A flat cathode ray tube display according to claim 6, wherein the drive circuit for the deflection electrode array is contained within the tube's envelope.

20. A cathode ray tube display apparatus according to claim 9, wherein the electrodes of the deflection electrode array and said tracks comprise conductive material deposited on the substrate.

* * * * *